United States Patent [19]
Hirzel et al.

[11] Patent Number: 5,820,058
[45] Date of Patent: *Oct. 13, 1998

[54] RETRACTOR FOR A VEHICLE SAFETY BELT

[75] Inventors: Uwe Hirzel, Auenwald; Bernhard Frei, Waldstetten, both of Germany; Albert Kinzel, Abersee, Austria

[73] Assignee: TRW Occupant Restraint Systems GmbH, Alfdorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 743,718

[22] Filed: Nov. 6, 1996

[30] Foreign Application Priority Data

Nov. 9, 1995 [DE] Germany .......................... 195 41 834.4
Jul. 26, 1996 [DE] Germany ....................... 296 13 044 U

[51] Int. Cl.$^6$ .................................................. B60R 22/28
[52] U.S. Cl. ........................................................ 242/379.1
[58] Field of Search ........................ 242/379.1; 280/805, 280/806; 297/470, 471, 472

[56] References Cited

U.S. PATENT DOCUMENTS 3,741,494 6/1973 Fiala ...................................... 242/379.1
5,176,335 1/1993 Honl et al. .
5,526,996 6/1996 Ebner et al. .......................... 242/379.1
5,547,143 8/1996 Miller et al. ......................... 242/379.1

FOREIGN PATENT DOCUMENTS

54166621 5/1978 Japan .
5661241 10/1979 Japan .
58171158 11/1983 Japan .
516763 1/1993 Japan .
07246913 9/1995 Japan .
07246914 9/1995 Japan .

*Primary Examiner*—John M. Jillions
*Attorney, Agent, or Firm*—Tarolli, Sundheim, Covell, Tummino & Szabo

[57] ABSTRACT

A retractor for a vehicle safety belt is provided, comprising a housing, a load bearing ratchet pawl supported in the housing, and a belt drum rotatably mounted in the housing. The belt drum is provided with ratchet disks at its axial ends. The ratchet disks are coaxial with the belt drum and are provided with a ratchet toothing at its outer circumference, into which the ratchet pawl can be engaged for locking the belt drum in the direction of pay-off of belt webbing coiled on the belt drum. The belt drum is further provided with energy take-up means arranged in the power transmission path between the belt drum and the ratchet disks. This energy take-up means are adapted to allow rotation of the belt drum in relation to the ratchet disks in the pay-off direction under heavy strain.

13 Claims, 7 Drawing Sheets

RETRACTOR FOR A VEHICLE SAFETY BELT

TECHNICAL FIELD

The invention relates to a retractor for a vehicle safety belt.

BACKGROUND OF THE INVENTION

Belt forces acting on a vehicle occupant with a fastened belt may be so great in a serious traffic accident that the vehicle occupant is injured. Therefore efforts are being made to limit the maximum force acting via the belt webbing. Various different schemes have been developed with this intent. Typically force limiting devices are employed, which under a heavy strain allow the belt webbing or the entire belt retractor to yield owing to elastic and/or plastic deformation with the result that due to the resulting forward displacement of the vehicle occupant an additional shift of the vehicle occupant is provided for deceleration. The result is a limitation of the force acting on the vehicle occupant. These force limiting devices are generally in the form of elements separate from the belt retractor and are unsatisfactory as regards the space required for mounting them.

BRIEF SUMMARY OF THE INVENTION

One object of the invention is to provide a compact belt retractor which limits the maximum force acting in the safety belt.

In order to obtain this object, the invention provides a retractor for a vehicle safety belt comprising a housing, a load bearing ratchet pawl supported in the housing, and a belt drum rotatably mounted in the housing. The belt drum is provided with ratchet disks at its axial ends. The ratchet disks are coaxial with the belt drum and are provided with a ratchet toothing at its outer circumference, into which the ratchet pawl can be engaged for locking the belt drum in the direction of pay-off of belt webbing coiled on the belt drum. The belt drum is further provided with energy dissipation means arranged in the power transmission path between the belt drum and the ratchet disks. This energy dissipation means is adapted to allow rotation of the belt drum in relation to the ratchet disks in the pay-off direction under heavy strain. It is in this manner that, when there is a high belt strain, with the aid of the energy dissipation means further belt webbing may be let off from the belt drum in a controlled fashion with the result that the maximum force acting in the belt webbing can be limited. Owing to the arrangement of the energy dissipation means in the power path between the ratchet disks and the belt drum a particularly compact design is produced.

In accordance with a preferred embodiment of the invention the energy dissipation means includes a torsion rod arranged within, and coaxially to, the belt drum, said torsion rod being connected at its axial ends with the ratchet disks in such a manner as to prevent relative rotation and between the same is connected with the belt drum in such a manner as to prevent relative rotation. The advantage of this design is that owing to the use of a torsion rod adaptation the characteristic curve of belt webbing force versus length of paid out belt webbing can be adapted to particular requirements in a simple manner.

Further advantageous developments of the invention are defined in the dependent claims.

BRIEF DESCRIPTION OF THE DRAWINGS

The invention will now be described with reference to the accompanying drawings.

DETAILED DESCRIPTION OF THE INVENTION

Figure 1:
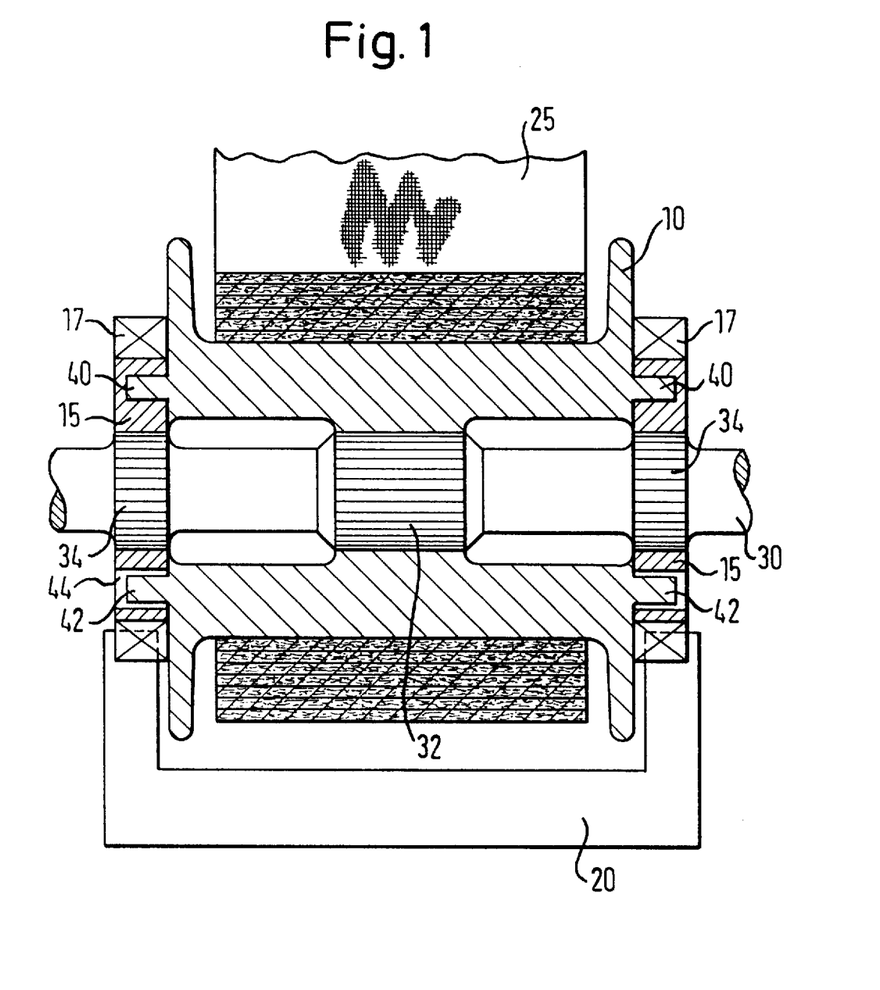
FIG. 1 is a diagrammatic cross section taken through a belt retractor in accordance with a first embodiment of the invention.
Figure 2:
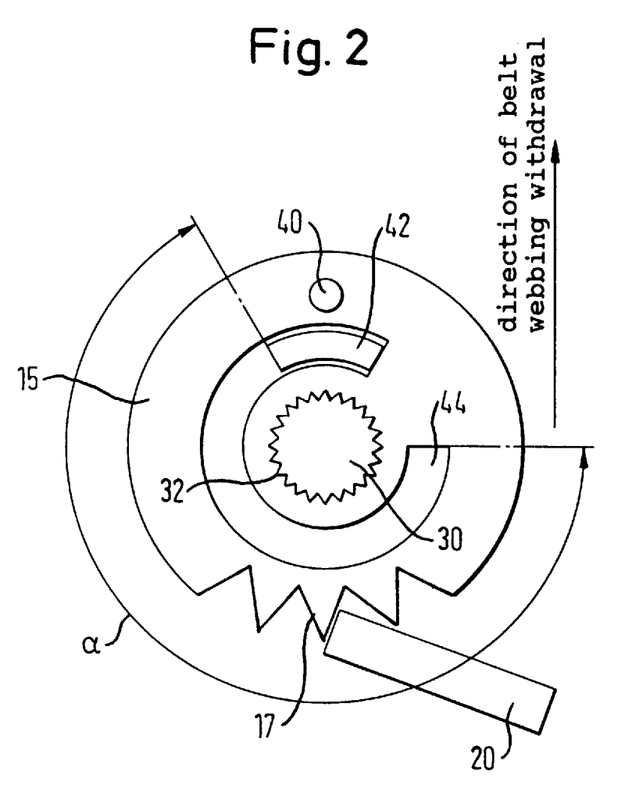
FIG. 2 is a diagrammatic lateral view of the belt retractor of FIG. 1.

In FIGS. 1 and 2 a belt retractor of the invention will be seen in a first embodiment thereof. Same comprises a housing (not illustrated), wherein a belt drum 10 is rotatably mounted which has diagrammatically indicated belt webbing 25 coiled thereon. Ratchet disks 15 are arranged at the axial ends of the belt drum 10, which are coaxial to the belt drum 10 and have ratchet tooth means 17 on their outer periphery for engagement by a ratchet pawl 20. The engagement of the ratchet pawl 20 with the ratchet tooth means 17 may be caused in a known manner either vehicle-sensitively or webbing-sensitively in order to lock the belt drum 10 in case of need so that essentially no further pay-off of belt webbing 25 wound on the belt drum 10 therefrom may take place.

A torsion rod 30 is arranged coaxially to the belt drum 10 and in the interior of same. This torsion rod has splines 34 at its axial ends for connection with an adjacent ratchet disk 15 in such a manner as to prevent relative rotation. Intermediate the sets of splines 34 the torsion rod is provided with splines 32 for connection with the belt drum 10 in such a manner as to prevent relative rotation.

The belt drum is furthermore provided at each end with a shear pin 40 fitting into a corresponding opening in each ratchet disk 15. Furthermore the belt drum 10 possesses at each of its ends a projection 42 fitting into a slot 44 having the form of a circular arc centered on the longitudinal axis of the belt drum 10 and extending over an angular range of α plus the angular range occupied by the projection 42. This is illustrated in particular in FIG. 2.

The function of the belt retractor in accordance with the invention is as follows: after triggering of a locking mechanism (not illustrated) in a vehicle-sensitive or a webbing-sensitive manner, the ratchet pawl 20 is pivoted into engagement with the ratchet tooth means 17. As a result the ratchet disks 15 are locked and cannot rotate any further in the direction of belt webbing pay-off. In a first range of loads exerted by the belt webbing on the belt drum 10 the shear pins 40 serve to lock the belt drum 10 as well against rotation in the belt webbing pay-off direction. If the load exerted on the belt drum 40 reaches a threshold value dependent on the size of the shear pins, the same are shorn off with the result that the belt drum may be turned in relation to the ratchet disks with twist of the torsion rod 30 in the pay-off direction of the belt webbing. Such rotation releases an additional length of belt webbing. The result is that there is a limitation of the force acting on the belt webbing and accordingly of the load acting on the vehicle occupant.

By using the belt retractor of the invention, the characteristic curve of belt webbing force versus paid off belt webbing length may be adapted in a particularly simple fashion to the circumstances of a particular vehicle type. The possible parameters affecting the function are as follows: bias of the torsion rod in the neutral position, material of the torsion rod, ratio between elastic and plastic deformation at maximum twist, variation in cross section of the torsion rod along the length thereof, etc. Owing to the engagement of the projection 42 in the slot 44 the maximum possible rotation of the belt drum 10 in relation to the ratchet disks 15 is limited to the angular range of α.

Figure 3:
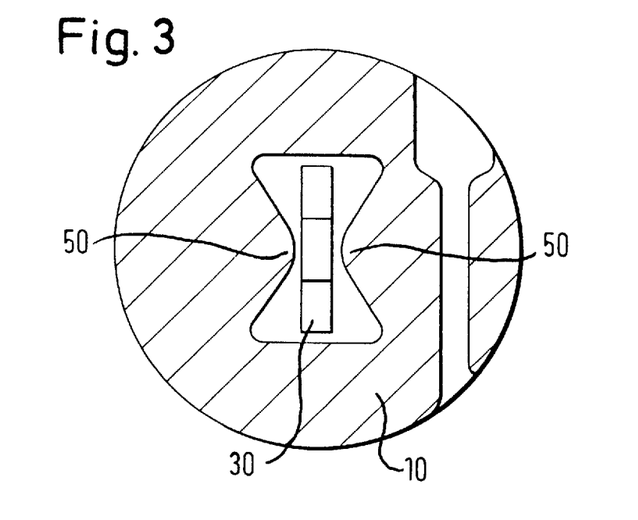
FIG. 3 is a diagrammatic cross section taken through the belt drum of a belt retractor according to a second embodiment of the invention.
Figure 4A:
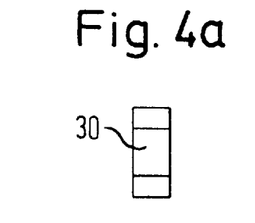
FIGS. 4a and 4b show the torsion rod utilized in the belt retractor of FIG. 3 in an end-on view and in a side view.
Figure 4B:
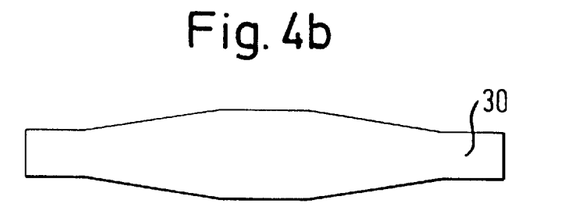
Figure 5:
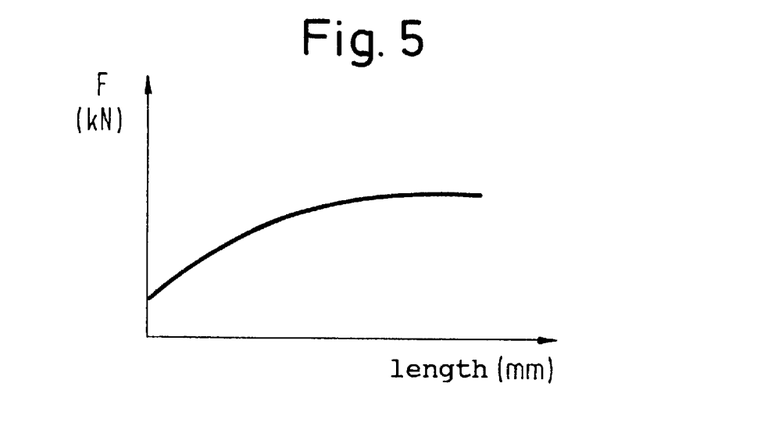
FIG. 5 shows the characteristic curve of belt webbing force versus length of paid out webbing with the second embodiment of the invention.

In FIG. 3 a cross section taken through the belt drum of a belt retractor according to a second embodiment of the invention is illustrated. The belt drum 10 is in its interior provided with two mutually opposite projections 50, which as from a given rotation of the belt drum 10 in relation to the torsion rod 30 engage same and hence limit further rotation thereof. The torsion rod 30 employed in this embodiment is represented in FIGS. 4a and 4b. It has a rectangular cross section with a constant thickness, the width of the torsion rod 30 increasing from a minimum value at each axial end, that is to say at the connection with the ratchet disks 15, to a maximum value in the middle of the torsion rod 30, that is to say at the connection with the belt drum 10. The characteristic curve of belt webbing force versus paid off belt webbing length is represented in FIG. 5. Owing to a bias of the torsion rod with a torque, which is preferably equal to the torque necessary for shearing off the pin, there is a degressively increasing curve of the belt webbing forces as draw off of belt webbing progresses, starting from an initial value differing from zero.

Figure 6A:
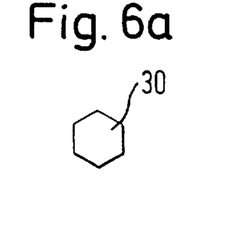
FIGS. 6a and 6b show an end-on view and a side view of a further embodiment of a torsion rod as may be employed in the first embodiment of the invention.
Figure 6B:
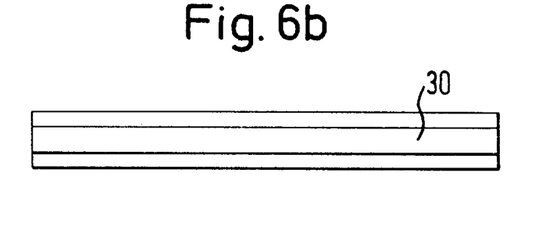
Figure 7A:
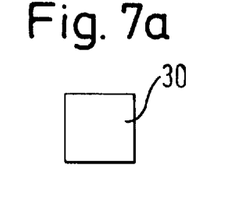
FIGS. 7a and 7b show a further embodiment of a torsion rod corresponding to that of FIGS. 6a and 6b.
Figure 7B:
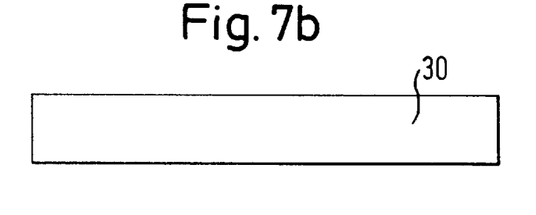

In FIGS. 6a and 6b and furthermore 7a and 7b further embodiments of the torsion rods are illustrated, which can be utilized in belt retractors in accordance with the first embodiment. The illustrated torsion rods 30 have the same cross section from end to end, that is to say with a hexagonal section in the case of the torsion rod 30 of FIGS. 6a and 6b and a square cross section in the case of the torsion rod 30 of FIGS. 7a and 7b. In the case of all torsion rods 30 depicted in these figures it is possible to dispense with the splines 32 and 34 (FIGS. 1 and 2), since the torsion rods 30 may be inserted directly in recesses, adapted to their cross section, in the ratchet disks 15 and of the belt drum 10, respectively.

Figure 8A:
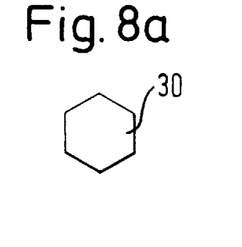
FIGS. 8a and 8b show a further embodiment of a torsion rod corresponding to that of FIGS. 6a and 6b.
Figure 8B:
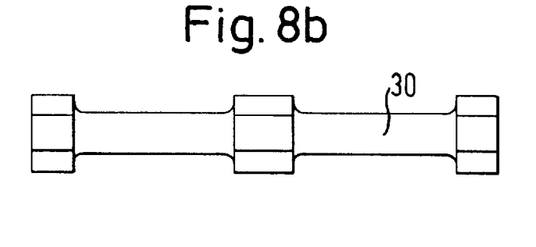

In FIGS. 8a and 8b a further embodiment of a torsion rod 30 is illustrated which may be employed in the first belt retractor of the invention. The difference with respect to the torsion rod 30 as shown in FIG. 1 is that instead of the splines 32 and 34 a hexagonal cross section is employed.

Figure 9:
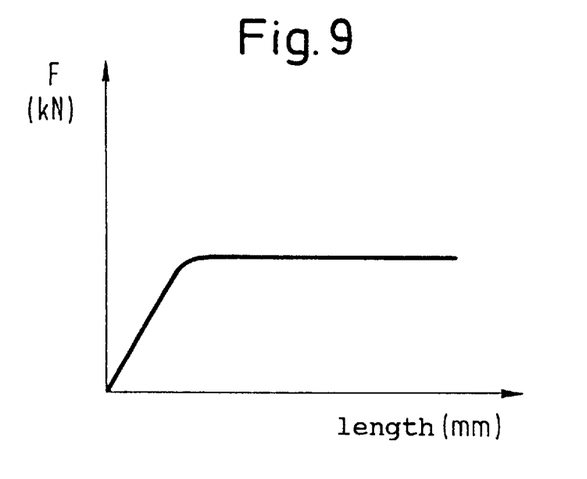
FIG. 9 shows the characteristic curve of belt webbing force versus length of paid out webbing for a belt retractor of the invention using a torsion rod in accordance with FIGS. 6a and 6b.

FIG. 9 shows the characteristic curve of belt webbing force versus paid off length of belt webbing, as obtained with the torsion rod of FIG. 6. This characteristic curve, which unlike the curve of FIG. 5 has an initial belt webbing force equal to zero, possesses a first section with a steeper slope than in the curve of FIG. 5 and a second section, wherein the belt webbing force remains essentially constant. Accordingly a sufficient belt webbing force is rapidly reached during the progressive increase of the belt webbing pay-off, even without any bias of the torsion rod 30.

The advantages of the described configuration of the belt retractor of the invention are as follows: owing to the use of the torsion rod arranged within the belt drum the force limiting function of the belt retractor is produced with an extremely compact shape of the belt retractor, whose dimensions are substantially identical to those of a customary belt retractor. As a result conventional belt retractors without force limitation means may be replaced by the belt retractor of the invention without design modifications in the vehicle being necessary. Separate force limiting means are dispensed with. Since the torsion rod is connected with the belt drum 10 in the middle between the two ratchet disks, the changes in length occurring during twisting of the torsion rod are distributed in a symmetrical manner between the two sides or ends of the belt retractor; the two ratchet disks are symmetrically loaded. The diameter of the torsion rod may be selected to be comparatively small, since the overall load on the belt drum is distributed between the two ends of the torsion rod. Owing to the configuration of the torsion rod the desired characteristic curve of belt webbing force versus paid off length of belt webbing may be set.

Figure 10:
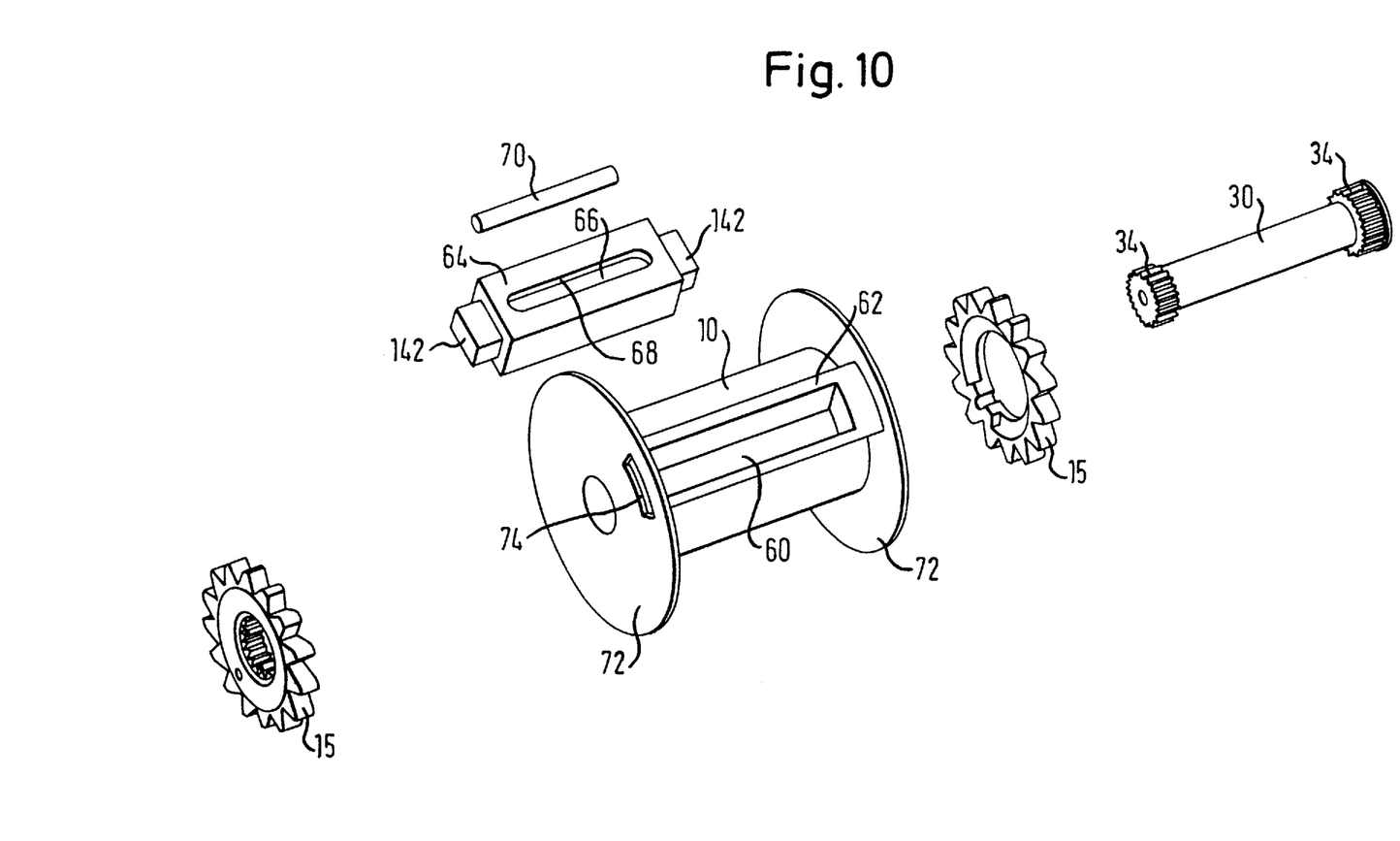
FIG. 10 shows a perspective exploded view of a belt drum having ratchet disks and a torsion rod according to a third embodiment of the invention.
Figure 11:
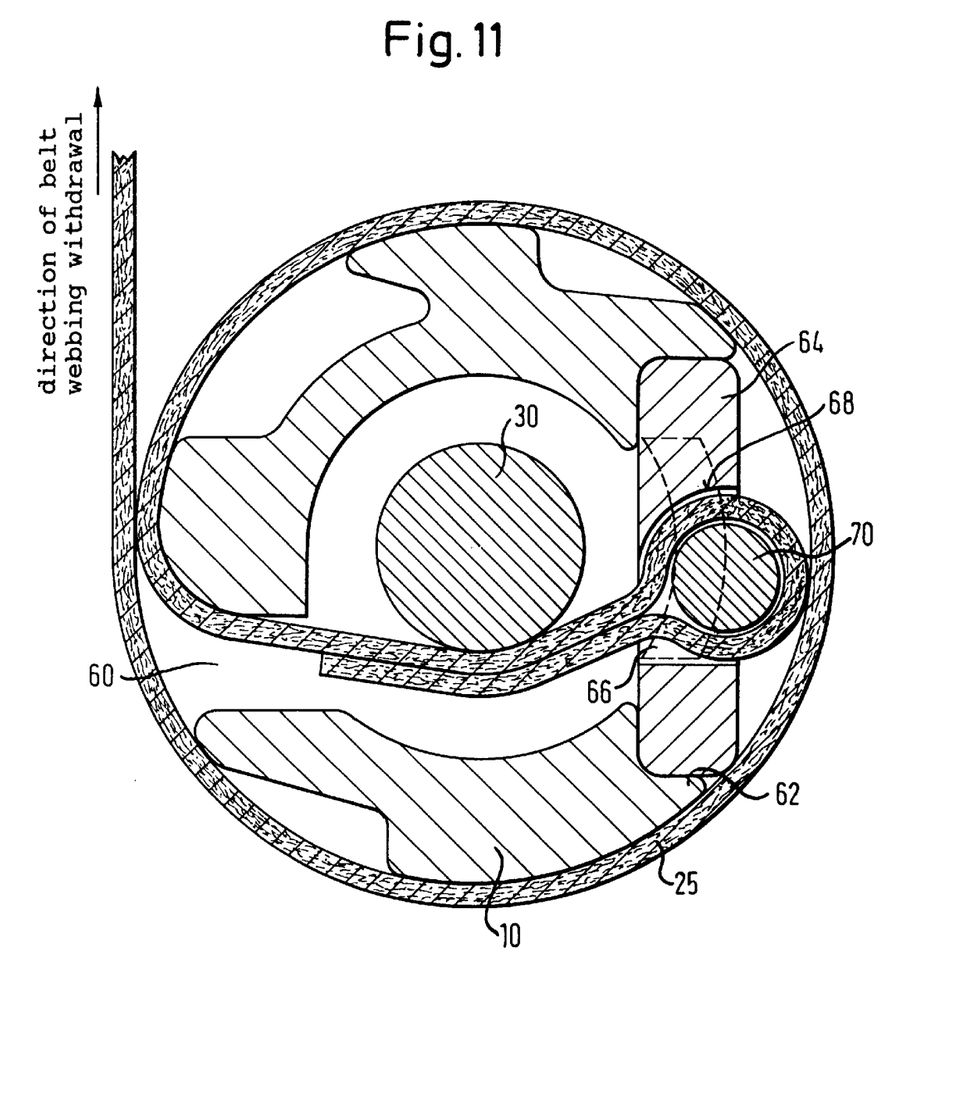
FIG. 11 shows a cross section taken through the belt drum of FIG. 10.
Figure 12:
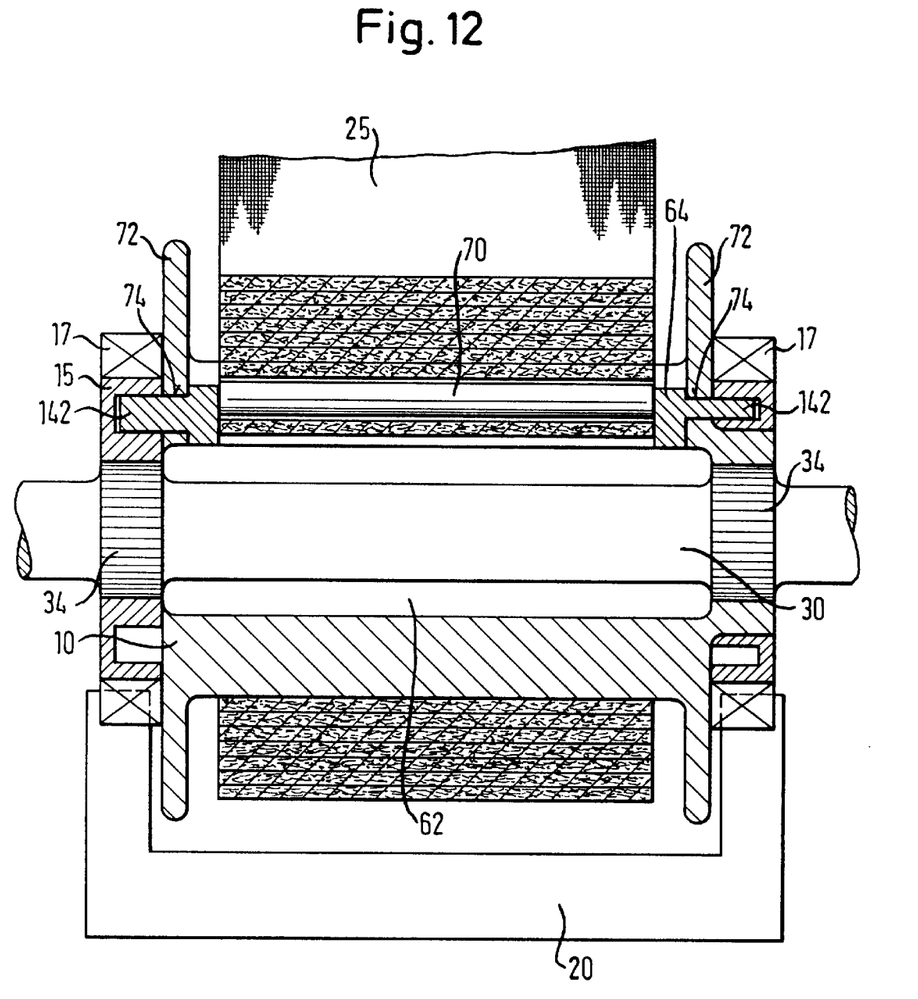
FIG. 12 is a longitudinal section taken through the belt drum of FIG. 10.

In FIGS. 10 through 12 a belt retractor in accordance with a third form of embodiment is illustrated. As regards the elements employed in the preceding embodiments reference is made to the respective accounts thereof.

Unlike the first embodiment the torsion rod 30 is not connected with the belt drum 10 in the middle but at one of its axial ends. The other axial end is joined to the ratchet disk 15 arranged on the corresponding axial end of the belt drum 10. In the neutral or resting state both ratchet disks 15 are connected to the belt drum 10 by means of shear pins 40 (not illustrated in FIGS. 10 through 12). On a predetermined load on the ratchet disks being exceeded, the shear pins are shorn and the belt drum 10 may turn in relation to the ratchet disks, such rotation being opposed by the torsion rod 30. The torsion rod 30 is preferably so biased that the torque necessary for shearing the shear pins 40 on the belt drum 10 is approximately equal to the torque which is exerted by the torsion rod 30 on the ratchet disk connected with it. The ratchet disk not connected to the torsion rod can turn freely with respect to the belt drum 10 since the corresponding shear pin is shorn off.

A further difference with respect to the first form of embodiment is that the belt drum 10 is provided with a continuous, axis-parallel slot 60 for attachment of the belt webbing. This slot 60 extends through the belt drum centrally, unlike the eccentric arrangement of the first embodiment, and is open at either end toward the peripheral surface of the belt drum 10, on which the belt webbing 25 is wound. At one end of the slot 60 a wider part 62 is provided, in which a holding plate 64 is arranged. The holding plate 64 has a generally rectangular cross section, is manufactured of steel and is provided with an opening 66. On the outer side of the opening 66 a recess 68 is formed, in which a holding pin 70 is arranged which is inserted into a loop at the end of belt webbing 25 assigned to the belt retractor. Starting at the holding plate 64 the belt webbing runs inward through the belt drum 10 so that it is attached on the belt drum 10 using the holding pin 70 and the holding plate 64. The holding plate 64 with its holding pin 70 does not protrude from the peripheral surface of the belt drum 10 to the outside, and accordingly winding up of the belt webbing 26 on the belt drum 10 is not interfered with. The design leads to particularly simple assembly.

The stop disk, designated with reference numeral 72, provided in a fashion similar to the preceding embodiments at each axial end of the belt drum 10 and projecting radially past its peripheral surface, is respectively provided with an aperture 74, into which the corresponding axial end of the holding plate 64 fits. Each axial end of the holding plate 64 is provided with a nose 142, having the same shape and the same function as the projection 42 explained in connection with the first embodiment.

The holding plate 64 has more especially the purpose of enhancing the strength of the belt drum. Owing to transmission of force from the belt webbing 25 to the belt drum 10 the holding plate is subject to comparatively high loads. The belt drum 10 is in comparison thereto generally subject to lower loads. Consequently, for the holding plate a material is employed, which possesses a comparatively high strength, as for example steel. Owing to the more even transmission of force via the holding plate 64 to the belt drum 10 there is therefore generally speaking a lower load on the belt drum 10, which for instance consists of an aluminum alloy, and such drum may be made with a smaller diameter for accommodating a longer length of belt webbing. The reduction in load on the belt drum 10 makes itself more particularly felt in all belt webbing draw off directions in relation to the holding plate 64. An additional advantage of the holding plate is that the projections 42 serving as an abutment and which may be subjected to a high load, are manufactured of a material able to be subjected to high loads.

In the case of a further development of the invention, which is not illustrated, connection of the belt drum 10 to a belt pretensioner is rendered possible in a simple manner because the torsion rod 30 is designed so as to be longer at one end and is coupled with the output end of a belt pretensioner drive. Furthermore in the case of the use of the belt retractor of the invention in combination with a gas bag restraining system it is possible to dispense with the need for limiting the angle of turning of the belt drum 10 in relation to the ratchet disks 15, since the draw off of belt webbing from the belt drum 10 is limited by the fact that the vehicle occupant plunges into the gas bag.

We claim:

1. A retractor for a vehicle safety belt comprising a housing, a load bearing ratchet pawl supported in said housing, and a belt drum rotatably mounted in said housing, said belt drum having axial ends provided with ratchet disks, each ratchet disk being coaxial with said belt drum and being provided with a ratchet toothing on its outer circumference, into which said ratchet pawl can be engaged for locking said belt drum against rotation in the direction of pay-off of belt webbing coiled on said belt drum, said belt drum being provided with energy dissipation means arranged in a force transmission path between said belt drum and said ratchet disks, said energy dissipation means being adapted to allow rotation of said belt drum in relation to said ratchet disks in said pay-off direction under heavy strain, said energy dissipation means including a torsion rod arranged within, and coaxially to, said belt drum, said torsion rod being connected on axial ends thereof with said ratchet disks in such a manner as to prevent relative rotation and between said ratchet disks is connected with said belt drum in such a manner as to prevent relative rotation.

2. The retractor of claim 1, wherein said torsion rod is so biased as to urge said belt drum to rotate in relation to one or both of said ratchet disks in a direction opposite to said pay-off direction.

3. The retractor of claim 1, wherein said torsion rod has a rectangular cross section and projections are arranged in the interior of said belt drum, said projections, as from a predetermined angle of rotation of said belt drum in relation to said torsion rod, coming into engagement with said torsion rod and hence limiting further rotation.

4. The retractor of claim 1, wherein said belt drum is provided with a slot for attachment of said belt webbing, said slot being parallel to a longitudinal axis of said belt drum and extending continuously and furthermore being open on either side to the peripheral surface of said belt drum, and wherein a holding plate is arranged at one end of said slot, said holding plate being provided with an opening for attachment of said belt webbing.

5. The retractor of claim 4, wherein said holding plate does not protrude past said peripheral surface of said belt drum to the outside.

6. The retractor of claim 4, wherein said holding plate is provided with a recess at its exterior side for a belt webbing holding pin.

7. The retractor of claim 4, wherein said belt drum has axial ends each provided with a respective stop disk, and wherein an aperture is provided at each of said stop disks, into which a respective end of said holding plate fits.

8. The retractor of claim 7, wherein said holding plate has axial ends each provided with a respective nose, said nose projecting from the outer side of each of said stop disks.

9. The retractor of claim 4, wherein said holding plate is manufactured of steel.

10. The retractor of claim 1, wherein a shear pin is provided on each axial end of said belt drum, said shear pin fitting into a hole in an adjacent one of said ratchet disks and being adapted to shear under high load.

11. The retractor of claim 1, wherein each of said ratchet disks is provided with a slot, which has the shape of a circular arc centered on said longitudinal axis of said belt drum, and wherein at each axial end of said belt drum a projection is provided, fitting into said slot and limiting a rotation of said belt drum in relation to said ratchet disks.

12. The retractor of claim 11, wherein said projections are formed at said axial ends of said belt drum by said noses of said holding plate.

13. A retractor for a vehicle safety belt comprising a housing, a load bearing ratchet pawl supported in said housing, and a belt drum rotatably mounted in said housing, said belt drum having axial ends provided with ratchet disks, each ratchet disk being coaxial with said belt drum and being provided with a ratchet toothing on its outer circumference, into which said ratchet pawl can be engaged for locking said belt drum against rotation in the direction of pay-off of belt webbing coiled on said belt drum, said belt drum being provided with energy dissipation means arranged in a force transmission path between said belt drum and said ratchet disks, said energy dissipation means being adapted to allow rotation of said belt drum in relation to said ratchet disks in said pay-off direction under heavy strain, said energy dissipation means including a torsion rod arranged within, and coaxially to, said belt drum, said torsion rod being connected at one axial end with one of said ratchet disks in such a manner as to prevent relative rotation and being connected at its other axial end with said belt drum in such a manner as to prevent relative rotation.

* * * * *